(12) United States Patent
Bueschenfeld et al.

(10) Patent No.: US 10,203,409 B2
(45) Date of Patent: Feb. 12, 2019

(54) METHOD AND DEVICE FOR THE LOCALIZATION OF A VEHICLE FROM A FIXED REFERENCE MAP

(71) Applicant: Volkswagen Aktiengesellschaft, Wolfsburg (DE)

(72) Inventors: Torsten Bueschenfeld, Uetze (DE); Stephan Max, Gifhorn (DE); Alexander Urban, Gifhorn (DE); Stefan Brosig, Hankensbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 517 days.

(21) Appl. No.: 14/944,181

(22) Filed: Nov. 17, 2015

(65) Prior Publication Data
US 2016/0139255 A1    May 19, 2016

(30) Foreign Application Priority Data
Nov. 17, 2014   (DE) .................. 10 2014 223 363

(51) Int. Cl.
*G01S 13/93*   (2006.01)
*G01S 13/89*   (2006.01)

(52) U.S. Cl.
CPC ............ *G01S 13/931* (2013.01); *G01S 13/89* (2013.01); *G01S 2013/9353* (2013.01); *G01S 2013/9375* (2013.01)

(58) Field of Classification Search
CPC ...................................................... G01S 13/89
(Continued)

(56) References Cited

U.S. PATENT DOCUMENTS 5,677,836 A * 10/1997 Bauer ................. A47L 11/4011
                                                        701/23
6,215,438 B1 * 4/2001 Oswald ................. G01S 13/931
                                                        342/104
(Continued)

FOREIGN PATENT DOCUMENTS

DE          39 15 631 A1    11/1990
DE          101 49 206 A1    2/2003
(Continued)

*Primary Examiner* — Marcus E Windrich
(74) *Attorney, Agent, or Firm* — Muncy, Geissler, Olds & Lowe, P.C.

(57) ABSTRACT

A method and a device for locating a vehicle from a fixed reference map in which objects are assigned one or more positions in the reference map. At successive points of a vehicle trajectory, in each case a radar impulse is emitted and subsequently, angle-resolved and time-resolved measurements of the radar impulse response are performed. Object positions are identified in the environment surrounding the vehicle from the radar impulse response, the current identified object positions forming an environment map. The vehicle position is identified in the reference map by comparing the environment map to the reference map, the reference map being created from the identified positions and is continuously updated. An object classification for the identified object positions in the current environment map and/or reference map is performed and the identification of the vehicle position is performed while taking the object classification into account.

12 Claims, 8 Drawing Sheets

(58) Field of Classification Search
USPC .................................................. 342/70–72
See application file for complete search history.

(56) References Cited

U.S. PATENT DOCUMENTS

| | | | | |
|---|---|---|---|---|
| 6,542,111 | B1* | 4/2003 | Wilson | B60T 7/22 180/168 |
| 9,221,396 | B1* | 12/2015 | Zhu | B60Q 9/008 |
| 2002/0044081 | A1* | 4/2002 | Cong | G01S 13/723 342/70 |
| 2007/0021915 | A1* | 1/2007 | Breed | B60N 2/2863 701/301 |
| 2008/0040029 | A1* | 2/2008 | Breed | B60N 2/2863 701/514 |
| 2008/0243378 | A1* | 10/2008 | Zavoli | G01C 21/28 701/533 |
| 2012/0271540 | A1* | 10/2012 | Miksa | G01C 21/30 701/409 |
| 2015/0025708 | A1* | 1/2015 | Anderson | A61B 5/6804 701/2 |
| 2015/0268218 | A1* | 9/2015 | Troxler | G01S 13/0209 342/21 |

FOREIGN PATENT DOCUMENTS

| | | |
|---|---|---|
| DE | 103 37 845 A1 | 3/2005 |
| DE | 10 2004 010 197 A1 | 9/2005 |
| DE | 10 2009 006 113 A1 | 9/2009 |
| DE | 10 2010 013 647 A | 2/2011 |
| DE | 10 2011 119 762 A1 | 6/2012 |
| DE | 11 2011 103 155 T5 | 7/2013 |
| DE | 10 2013 011 969 A1 | 1/2015 |

\* cited by examiner

METHOD AND DEVICE FOR THE LOCALIZATION OF A VEHICLE FROM A FIXED REFERENCE MAP

This nonprovisional application claims priority under 35 U.S.C. § 119(a) to German Patent Application No. 10 2014 223 363.1, which was filed in Germany on Nov. 17, 2014, and which is herein incorporated by reference.

BACKGROUND OF THE INVENTION

Field of the Invention

The invention relates to a method and device for improved localization of a vehicle from a stationary reference map.

Description of the Background Art

Systems are used in vehicles, in particular motor vehicles, which require information about the existence of objects in the environment surrounding the vehicle, as well as information on the position and dimension of said vehicle. Information on a vehicle's surroundings, in particular to distinguish between streets, open spaces and obstacles, is necessary for navigating in an unknown area. It can also be used as an input parameter for autonomous assistance systems such as automatic parking aids or parking assistance systems, brake assists and accident preparation systems.

Today, more and more vehicles are being developed which run from partially automated to highly or fully-automated. A crucial aspect in this respect is the location of the vehicle relative to objects in the surrounding environment.

From the prior art, different measurement methods are known which are used to identify the environment and to pinpoint streets, open spaces and obstacles. Most of these are based on measuring the runtime of a pulse that is sent out from the vehicle and which reflects back from objects. For example, ultrasound measurements are very widespread.

From the publication DE 103 37 845 A1, a control assembly for a vehicle and a method for identifying a vehicle position on a roadway are known. Ultrasound or radar sensors are hereby sometimes affixed to the sides of the vehicle to also measure the area in the lateral surroundings of the vehicle. Roadside and roadway are identified from the impulse response measurements. The control signals resulting therefrom are then aimed to be conveyed to assistance systems, for example, for accident prevention or for parking assistance.

From the publication DE 10 2010 013 647 A1, which corresponds to U.S. 2010/0256835, another method is known for controlling multiple vehicles which drive in a convoy consisting of a lead vehicle and several vehicles. The vehicles are piloted by means of vehicle-to-vehicle communication and by the detection of position coordinates, wherein the vehicles always follow the lead vehicle and autonomously pilot their position using their relative position to the lead vehicle. The current positions of a vehicle in the convoy are thereby identified by means of vehicle-to-vehicle communication und a global positioning device, wherein the monitoring of the vehicle positions commanded by the lead vehicle occurs by monitoring the distance between the vehicles. The predetermined vehicle distance can be dynamically assigned, for example, per criteria such as vehicle speed, braking properties, weather conditions, street condition or fuel consumption.

Furthermore, from the prior art, systems are known which feature cameras built into the vehicle, for example front cameras, which utilize road signs, lane markings, etc. to find unique characteristics in the picture. This way, so-called landmarks can be placed on a reference map. This makes it possible to highly accurately identify the position in all subsequent trips using the current image features as they relate to the reference map. When using camera-based systems to identify landmarks, for example, poor visibility, darkness, reoccurring image content and a small opening angle of the camera can diminish robustness.

From the field of robotics, a method for tracking autonomous robots by means of a radar using so-called SLAM methods (Simultaneous Location and Mapping) is known. Although SLAM methods are mostly independent of weather conditions, they do not provide unambiguous features and are highly bound to a known, statistical geometry of the surrounding structure.

The known systems are able to, at least rudimentarily, determine the positions of objects in the area surrounding the vehicle. It is also possible to identify a vehicle position from a reference map when there is low accuracy. Object positions exclusively identified by odometry prove to be too inaccurate. Positions identified by a satellite information system, e.g. GPS/D-GPS (GPS-Global Positioning System; D-GPS Differential Global Positioning System) are just as inaccurate and furthermore not available, for example, in parking garages. Therefore, the positions thus identified do not meet the demands of future, autonomously navigating and operating assistance and control systems in vehicles.

SUMMARY OF THE INVENTION

It is therefore an object of the invention to optimize the accuracy in determining object positions and object features in the area surrounding the vehicle so that locating a vehicle in a changing environment from a reference map can be improved.

An exemplary embodiment of the invention is based on the concept that locating a vehicle in an environment, i.e. from a reference map representing the environment, occurs with the aid of object positions obtained from radar measurements. Aside from the object positions identified, further object properties are taken into account which are assigned to the object positions via classification.

A position can denote the smallest local unit in the environment map or the reference map. In an environment map or reference map divided into cells, one position, for example, can define one of these cells.

An object position is a position belonging to a physical object or location in the environment map or reference map. Depending on its dimension, one or more object positions can be associated with one physical object.

Radar measurement is a measurement which can comprise the following steps: radar impulse emission and subsequent angle-resolved and time-resolved measurements of the radar impulse response.

A time-resolved measurement is radar measurement in which the time difference is recorded between which the radar impulse is emitted and the radar impulse from a reflected object in the surrounding environment arrives, and the angle at which the reflected radar impulse is measured is also recorded. This is done, for example, by using at least two antenna structures at positions locally spaced apart. Since the distances between the object and the antennas differ, the angle can be identified, for example, via a phase shift in the measured radar impulse response.

A radar impulse response thereby comprises none, one or a multitude of radar echo(s) which were formed at physical objects in the surrounding environment by the reflection of the radar impulse and which are evoked by one single radar impulse.

The radar impulse response intensity which corresponds to a certain object position defines the strength of the radar echo measured for this object position.

In particular, a method for the improved localization of a vehicle from a reference map is proposed, comprising the steps: Performance of radar measurements at successive points of a vehicle trajectory, wherein when performing radar measurement, in each case a radar impulse can be emitted and subsequently a radar impulse response is measured angle-resolved and time-resolved; identification of object positions from the radar impulse response in the area surrounding the motor vehicle, wherein the current, identified object positions form an environment map; identification of the vehicle position in the reference map by comparing the environment map to the reference map, whereby the reference map is generated by the identified object positions and is continuously updated. According to an embodiment of the invention, classification for the object positions in the current environment map and/or the reference map is performed, wherein the object classes assigned to the positions are factored in when identifying the vehicle position.

Furthermore, a device for improved localization of a vehicle is provided that can include: a radar measurement device, which in each case can emit a radar impulse at successive points of a vehicle trajectory and subsequently performs an angle-resolved and time-resolved measurement of the radar impulse response; a positioning device, which identifies object positions in the area surrounding the vehicle from one of the radar impulse responses, wherein the object positions form an environment map; a memory, in which the reference map is stored; a localization device, comprising a positioning device that identifies the vehicle position in the reference map by comparing the environment map to the reference map; and a merging device, which creates and continuously updates the reference map from the identified object positions; and a classification unit which classifies the object positions in the current environment map and/or reference map, wherein the object classes intended for the object positions are taken into account when identifying the vehicle position.

A benefit of the invention is that improved vehicle localization relative to the objects in the surrounding area, as compared to methods such as GPS/D-GPS, can be obtained with the aid of classification and the continuous merging of the measurement and classification results in the reference map. As a result, it is possible to locate the vehicle more accurately from the reference map. Also, when merging the identified object positions, it allows for the creation of a reference map with a higher resolution than is possible from the prior art, while the individual radar measurements have the same significance. Furthermore, radar measurement is largely independent of weather conditions, for example visibility and darkness, as opposed to the camera-based methods. In addition, classification of the received radar impulse responses with reference to the identified object position has the advantage that an unambiguous identification of object features can be performed. These features can then be used in the current environment map when creating and merging the reference map, and when locating a vehicle, and can in that way improve the localization results, for example by weighting or dismissing objects which belong to a certain object class. A further, substantial advantage is the possibility of operating without externally fed positioning data, for example, from the GPS. This way, the identification of the vehicle position can be performed completely autonomously, for example, also in parking garages.

Generally, one or more abstract features that are identified from one or more radar impulse responses and/or the object positions identified therefrom, can be used for classification. An object class does not necessarily have to be associated with an existing object type, for example a vehicle, a tree, etc., it can also be abstract, i.e. only defined by the traits that lead to the fact that an object position, or multiple adjacent object positions, are associated with the respective object class. In this way, classification can lead to object positions that belong to different real objects assigned to the same object class.

An embodiment of the device provides that the classification unit uses a reflection quality of the radar impulse response as a classification criterion, which is associated to a certain object position in the current environment map and/or reference map. This provides the benefit that aside from the pure object position, information in respect of the quality of the radar impulse response belonging to the object is also stored, evaluated and can be taken into account during classification and localization.

An embodiment of the device has proven to be particularly advantageous in which the exemplary one classification device assigns the intensity of the corresponding radar impulse responses to the object positions. However, other embodiments are also possible. The advantage of this embodiment is that by means of the intensity of the corresponding radar impulse responses, statements about the features and the composition of the object such as the surface properties or the object material can be made, which could, for example, include a wooden or a metal sign, which can be included in the classification and localization of the vehicle.

An exemplary embodiment provides that the positioning device uses the object positions identified from a single radar impulse response to identify the vehicle position from the reference map. The advantage lies in the possibility of immediately defining the vehicle position from the reference map, that is from a single measurement. The environment map can be defined only by the object positions identified in the current measurement.

A high level of positional accuracy is obtained by an exemplary embodiment of the device in which the merging device merges several of the angle-resolved, individual measurements into a single, updated environment map, and the current environment map is used by the positioning device to determine the vehicle position from the reference map. This provides the advantage that the object positions and features in the vehicle surrounding environment can be more accurately defined for the environment map area. It is, for example, conceivable that an object is detected from several directions by the proper motion of the vehicle.

In this way, the accuracy of the local resolution is increased since a greater number of object positions are available and accordingly, the local, current environment map provides more information. This ensures improved position detection when comparing the local, current environment map to the reference map, and in particular, improved classification. By merging the individual measurements, for example, numerous object positions and the associated radar impulse response information are available for each object in the vehicle surrounding environment. This way, the object positions belonging to one object are better identified in their spatial placement and are thus visible in the environment map as extended features. Furthermore, other information which can be gleaned from the radar impulse responses, for example from the reflection quality, can be available as classification features. The higher number of object positions in the environment map and the already recognizable object structures due to the merging, ease the alignment of the environment map relative to the reference map, allowing for faster and improved localization of a vehicle.

A further advantageous embodiment of the device stipulates that the classification device carries out a pattern recognition at object positions in the environment map and/or the reference map, that it identifies an object class by using a detected pattern and that it assigns the object class of the detected pattern from the environment map and/or the reference map to the object positions. The advantage is the possibility of identifying the type of object and assigning an object class to each of the corresponding object positions. Examples could be a metal sign, a bush, a parked car, a house or a curb. In the subsequent vehicle localization from the reference map, the object class can thereby be taken into account as a feature for decision-making when evaluating and weighting the object position during the comparison between the environment map and the reference map. For example, aside from the corresponding of positions, the object class assigned to the object positions can also be compared. For example, if the object class is known, the object position of a bush, which radar impulse response is subject to stochastic fluctuations due to physical and biological traits of the foliage, can be better recognized than it would be possible without classification. In order to compare the reference map to the environment map, no exact agreement of the bush's object positions is required, but instead only a correlation which takes the stochastic fluctuations of the radar impulse response into account. If the object positions in the reference response in an area of the reference map are classified as corresponding to a bush, a comparison with an environment map, which is derived from only one individual measurement, can verify whether the number of object positions in the area of the environment map are compatible with a bush, e.g. do not constitute a sharp contour formed by multiple object positions. If the environment map is merged by multiple radar impulse measurements and pattern recognition has occurred in both the reference map and the environment map, then instead of the object position comparison, a comparison can take place which examines whether at a predefined distance to an object position, classified as the component of a bush, an object position assigned to the object class bush also exists in the corresponding, other map.

During classification, for example, it can be identified that a group of object positions in a map is part of a vehicle which is parked at the edge of the road. With the general knowledge that as a rule, vehicles parked at the roadside only remain stationary for a limited period of time and are then moved, this information can be used to classify such vehicles as mobile/stationary objects. However, a vehicle which was just mapped may no longer be present in the area. In the same way, a vehicle currently present in the area may not have existed yet when the reference map was created. Thus, an embodiment of the device provides that a modification device can carry out a modification of the positions in the reference map and/or environment map pertaining to an object on the basis of object class, wherein the object position in the current environment map and/or reference map and/or classification information is modified. The advantage of this embodiment is that the current environment map and/or reference map contains information with respect to the features of the objects listed therein. This information can be continuously updated and thus enables improved mapping of the surrounding area and improved vehicle localization from the reference map.

An embodiment of the device has proven to be particularly advantageous in that the modification device assigns an existence probability to an object in the reference map using the object class. What is advantageous in this embodiment is the possibility of tagging objects with features that are subject to temporal fluctuations. One example can be the seasonal fluctuation of the radar impulse response of a bush, which has dense foliage during the summer and no leaves in the winter. If an existence probability is assigned to the bush, the seasonal effect can be taken into account by appropriate weighting in the vehicle localization.

Another embodiment provides that the classification of objects within the areas of the reference map, performed in the classification device, can occur with the aid of machine learning techniques. The advantage of this embodiment is that no exceptions need to be made regarding the patterns, but instead machine learning techniques are used to allow the operating machine to learn the features of the individual object classes which are later used for classification by using preselected example objects, for example 100 radar impulse responses of various bushes. Example techniques can be neural networks, naïve Bayes classifiers or hierarchical temporal memory.

An embodiment of the device provides that the classification of the objects performed in the classification device can occur within the areas of the reference map, using previously made model assumptions in regards to the radar impulse responses for certain object classes. An advantage of this embodiment is that no learning cycles are necessary.

An exemplary embodiment of the device provides that the classification device can identify the position of a mobile object via its speed and direction of movement, relative to the proper speed and direction of movement of the vehicle via a frequency-dependent analysis of the radar impulse response, and that the object classified as mobile and/or the updating of the reference map are not taken into account when identifying the vehicle position. The advantage is that during localization, mobile objects such as pedestrians or other moving vehicles are neglected in the area surrounding the vehicle. This way, improved localization with the stationary object positions is possible.

A further embodiment of the device provides that positions which tag a mobile/stationary object after classification by a classification device cannot be taken into account when identifying a vehicle position. An object can be considered to be mobile/stationary if it is stationary during its capture, yet not permanently stationary due to its nature or type, for example, it can also move. For example, cars, trucks, motorcycles, etc. are mobile/stationary objects when they are not in motion while they are being identified by a radar impulse measurement. The advantage of tagging mobile/stationary objects during vehicle localization is, aside from the suppression of object positions tagged in this way, the possibility of, for example, tagging locations of parking lots using these mobile/stationary objects, such as parked vehicles, and storing them for later retrieval, for example, when searching for a parking space.

An embodiment of the device provides that classification of the objects for the data already present in the reference map can be performed.

An advantage of this embodiment is the possibility of assigning object classes to already mapped objects in the reference map and of conditioning the data present in the reference map, for an improved vehicle localization. To save or better utilize computing power, this conditioning of the already present data could, for example, always take place when the utilization by other calculation processes is low.

An embodiment of the device can provide that the classification and evaluation of the objects performed by the classification device can be undertaken by the radar impulse responses of the current individual measurements or the current environment map. An advantage thereof is that objects can already be classified during the current individual measurement or environment map and can thus be taken into account when identifying of the vehicle position, based on a comparison of the current object positions with the object positions weighted in the reference map. This saves computing power and increases the accuracy of the localization. A further advantage of this embodiment is the possibility of suppressing certain object classes during the mapping process. For example, objects classified as mobile or mobile/stationary could be disregarded.

An embodiment of the device additionally provides that the control device comprises an interface for receiving standardized positioning data, and that for the rough orientation of the vehicle position and/or the positions in the reference map of the localization device, geographic coordinates of satellite-based global positioning systems and/or other tracking systems are supplied or can be supplied.

An advantage of this embodiment is that in unknown vehicle positions, for example after a vehicle transport on a truck or in a train, a rough orientation from the reference map can be performed. By assigning absolute positioning data, the range of search in which the vehicle needs to be located can be delimited in the reference map. This reduces the required computing time and leads to faster localization.

An embodiment of the invention provides that the reference map can be broken down into cells.

An embodiment of the device for the improved localization of a vehicle provides that the positioning device, the memory, the localization device, the merging device and the classification device can be combined in a control unit.

This has an advantage that the devices mentioned above can be implemented in a single, microprocessor-controlled unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
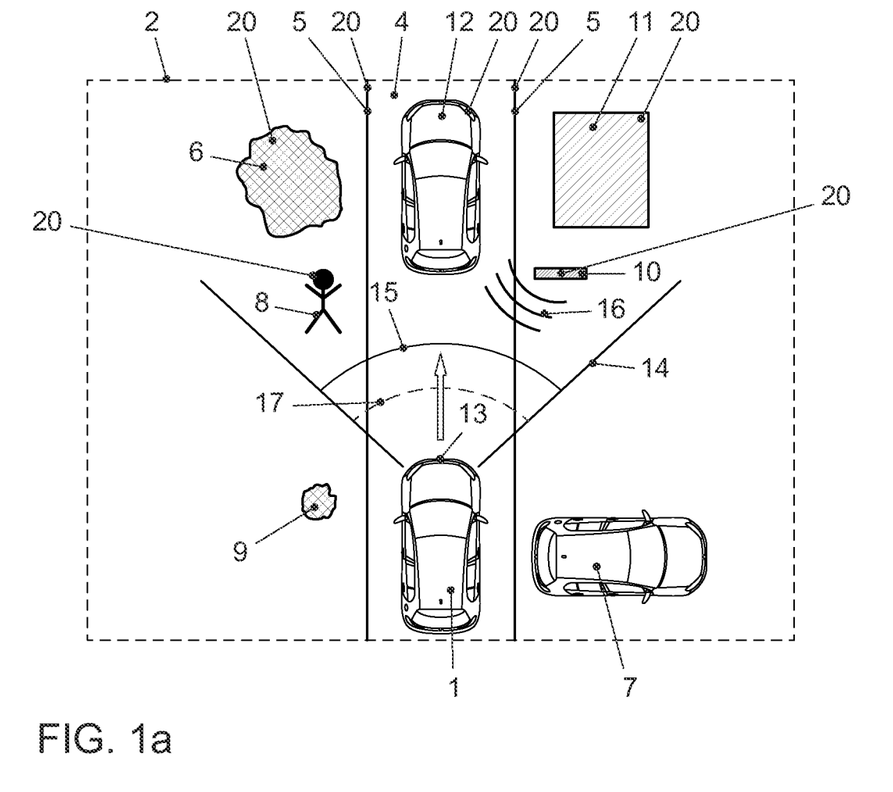
FIG. 1a is a schematic representation of a view of the environment in which the surrounding environment of the vehicle is viewed from above.

FIG. 1a shows a typical view of the environment in form of a schematic representation, such as it often can be found in daily traffic. A vehicle 1 is moving on a lane 4 in the surrounding environment 2. The vehicle 1 features a radar sensor 13, which e.g. can be affixed at the front end of the vehicle 1. The radar sensor 13 has an emission range 14 within which the objects 20 are captured. In the embodiment shown in FIG. 1, the objects 20 comprise, for example, a curb 5, a tree 6, a parked vehicle 7, a pedestrian 8, a bush 9, a metal sign 10, a house 11 and a moving vehicle 12. The opening angle 17 of the emission range 14 can, for example, be 140°, but can also be larger or smaller. In the embodiment shown in FIG. 1, the radar sensor 13 emits a radar impulse 15 which is reflected as a radar impulse response 16 by the objects 20 which lie within the opening angle 17 of the emission range 14, for example by a metal sign 10. The radar impulse response 16 is received by the radar sensor 13 and is measured angle-resolved and time-resolved. Using the measured radar impulse response 16, the object positions of the objects 20 at which the radar impulse was reflected, for example the metal sign 10, are identified. The positioning is performed accordingly for all objects 20 in the surrounding environment 2. The proper motion of the vehicle 1 continuously displaces the surrounding environment 2 from one radar impulse measurement to the next in the absolute position so that the opening angle 17 of the emission range 14 of the radar sensor 13 continuously scans new objects 20 in the vehicle's driving direction 1.

Due to their diverse properties, the components of the radar impulse response 16 differ from the various objects 20 within the opening angle 17 of the emission range 14 of the radar sensor 13. This way, these objects 20 can be classified in the environment 2 using their radar impulse response 16. For example, the bush 9 can be differentiated from a curb 5 or a moving 12 or parked vehicle 7.

Figure 1B:
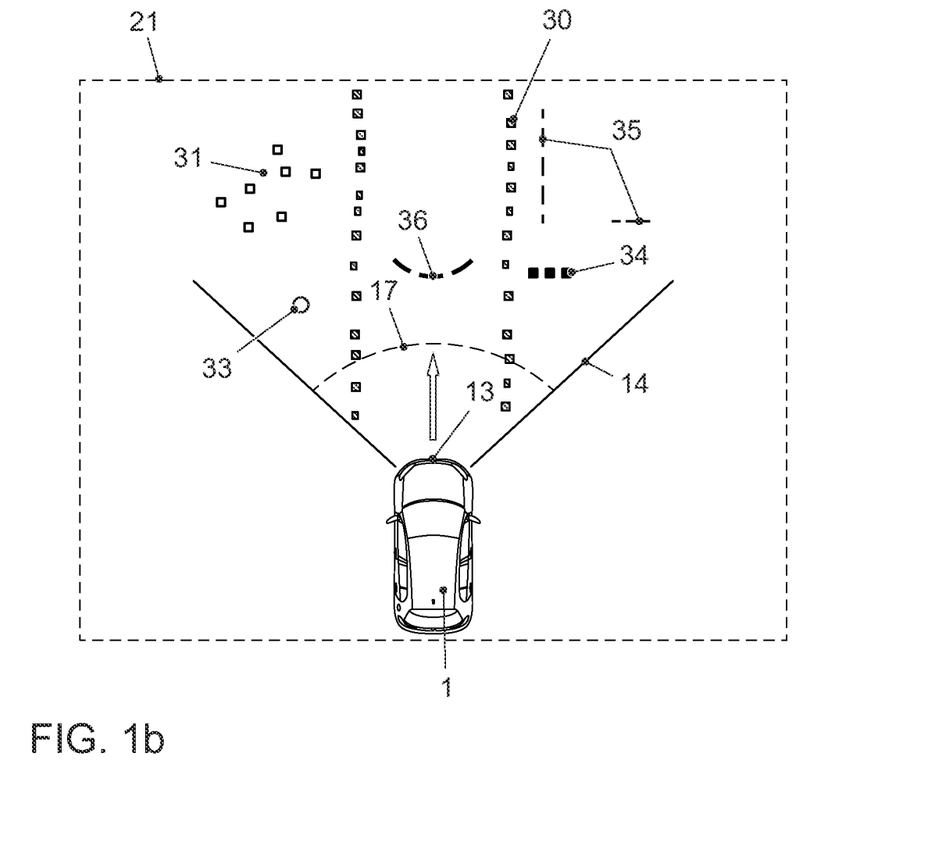
FIG. 1b is a schematic representation of the object positions corresponding to FIG. 1a, which were identified by a single measurement of a radar impulse response.

FIG. 1b shows a schematic representation of object positions which were identified from the radar impulse response, obtained from a single measurement. In the process, the object positions identified by the radar impulse response correspond to the objects 20 shown in the opening angle 17 of the emission region 14 of the radar sensor 13 in FIG. 1a, which in the opening angle 17 comprise the curb 5, the tree 6, the pedestrian 8, the metal sign 10, the house 11 and the moving vehicle 12. Due to the fact that only a single measurement is shown here, shadowing effects can occur. This is shown here in the example of the missing intensity 35 at the corner of the house 11, which from the perspective of the radar sensor 13 is covered by the metal sign 10. Schematically, the intensity corresponding to the object positions is shown as shading density. This way, the metal sign 10 delivers a greater intensity 34 in the radar impulse response than, for example, the tree 6 with the intensity 31 or the pedestrian 8 with the intensity 33. Therefore, FIG. 1b shows an environment map 21 in which for the purpose of explanation, the vehicle 1 with the radar sensor 13, the emission range 14 and the opening angle 17 are shown.

Figure 2:
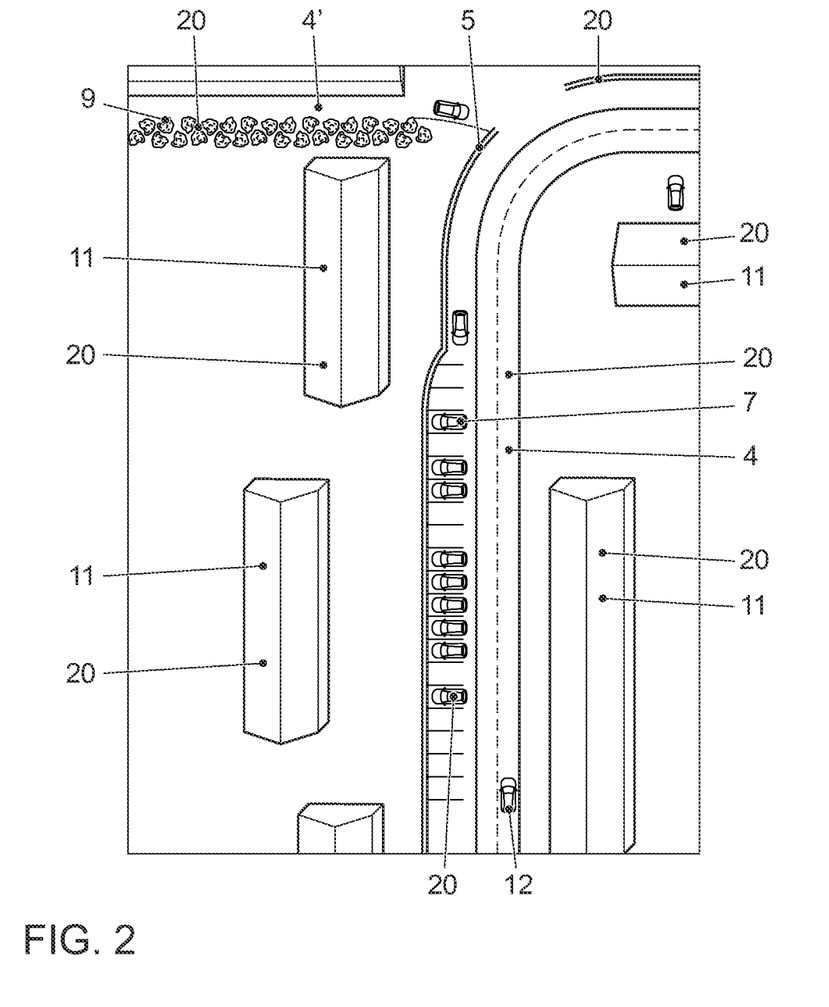
FIG. 2 is a satellite image of a real environment.

FIG. 2 shows a satellite image of a typical traffic situation. In the image, one can see several objects 20. A lane 4 is surrounded by several houses 11. The lane 4 is lined with a curb 5 on both sides. In the lane 4, there are a moving vehicle 12 and several parking bays arranged perpendicular to the driving direction in which there are parked vehicles 7. At the upper end of the picture, a further lane 4☐ running perpendicular to lane 4 can be seen at which edge there are several bushes 9.

Figure 3:
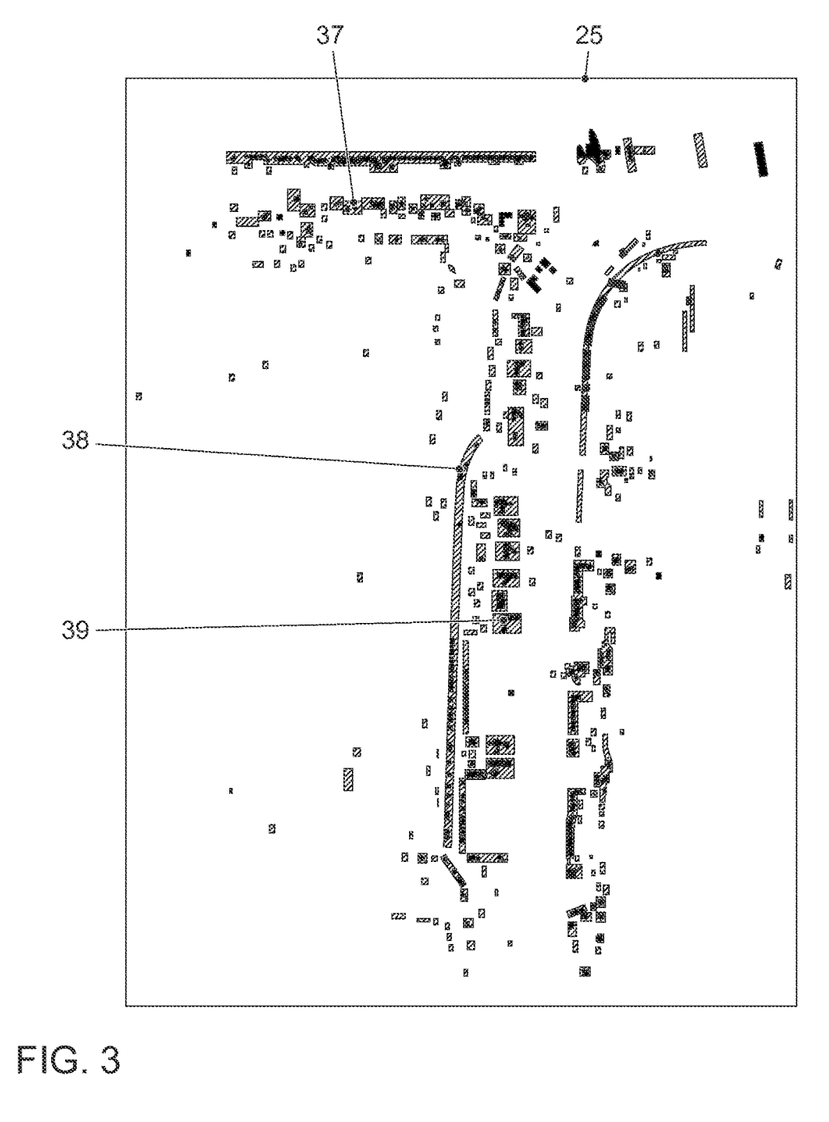
FIG. 3 is a reference map corresponding to the satellite image, formed from the radar impulse responses.

FIG. 3 shows a typical reference map 25. The reference map 25 thereby corresponds with the situation shown in FIG. 2, wherein the pictures were taken at different times so that only stationary objects 20 such as the houses 11 match. The reference map was hereby merged from several radar measurements of the radar impulse responses at multiple positions in the lane 4 shown in FIG. 2. If the vehicle 1 now returns to an already mapped area, it creates a current environment map using one or more merged radar measurements of the immediate environment, which can be smaller than the area mapped in the reference map. The measurements of the current environment map are identified by the proper motion of the vehicle 1 since radar measurements are performed with a fixed repetition frequency. A current environment map is then created from the number of n radar measurements through merging. If n=1, only a single, angle-resolved radar measurement is used to form the environment map. A physical object in the surrounding area thereby delivers a plurality of signals within the measured radar impulse response. With an extended object such as a house 11, multiple object positions can be identified from which a contour of the house becomes apparent.

If n>1, a larger area of the surrounding environment is used to form the current environment map because of the proper motion. However, since n is finite for the environment map, the environment map continuously shifts with the proper motion of the vehicle 1 relative to the absolute position. Typically, the measurements of a current environment map formed this way amount from several meters to several 100 m, depending on the proper motion and range of the radar emission of the vehicle 1.

Figure 4:
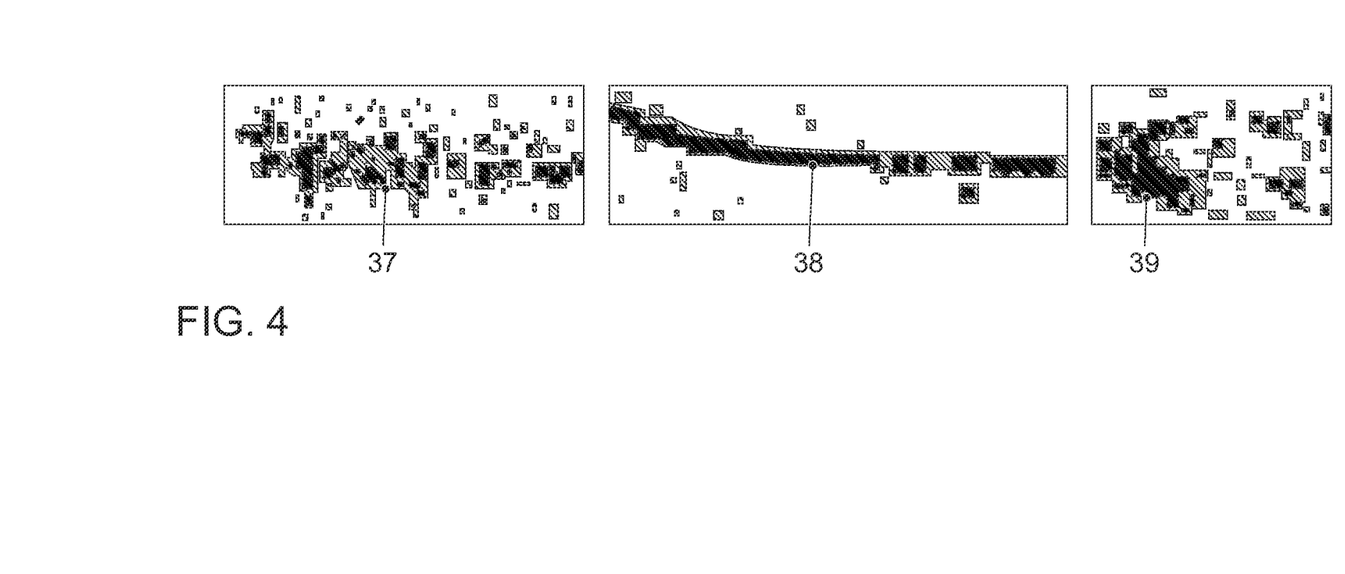
FIG. 4 illustrates excerpts from the environment map for different object classes; examples shown are typical patterns for a bush, a curb and a vehicle.

The classification is then performed using the object positions in the environment map and/or reference map. The specific object class is then assigned to the corresponding object positions. For classification, pattern recognition techniques can be used. Typical patterns, formed by the object positions of a few objects which are in turn formed by radar impulse measurements, are shown in FIG. 4. This way, for example, a bush 37, a curb 38 and a vehicle 39 can be distinguished from one another, and then classified and tagged by pattern recognition techniques.

A modification, for example, performed by a modification device, can later remove for example, parked vehicles or other objects from the environment map and/or reference map on the basis of object class, or assign them an existence probability. The localization of the vehicle from the reference map takes place by comparing the current environment map to the reference map. The object classes are thereby considered.

Figure 5:
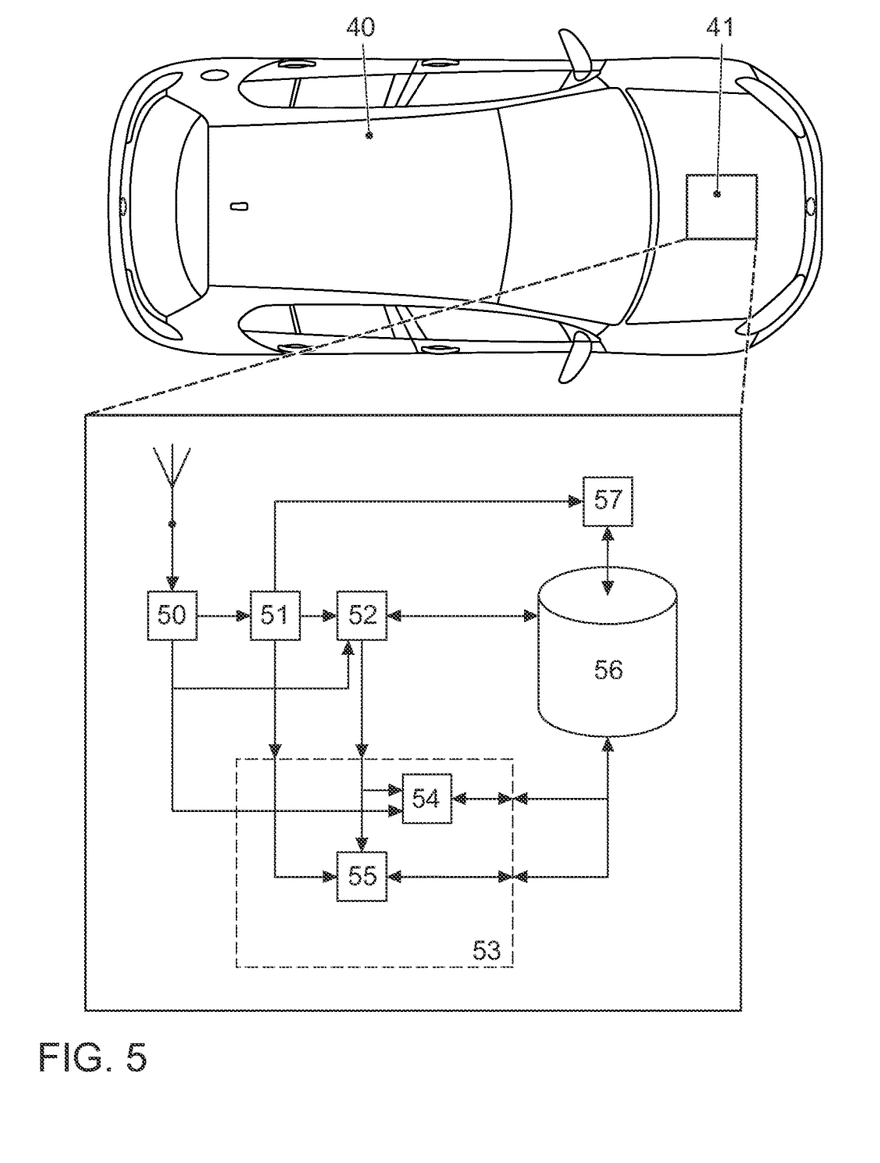
FIG. 5 is a schematic representation of a possible embodiment of the device for the improved localization of a vehicle.

In accordance with FIG. 5a, an embodiment provides a device integrated in a vehicle 40 for the localization of the vehicle 41. A radar measurement device 50 thereby performs the radar impulse emission and the angle-resolved and time-resolved measurements of the corresponding radar impulse responses. The raw data is then forwarded to a positioning device 51 which identifies the object positions of the objects in the area surrounding the vehicle. Finally, the results go to a classification device 52 as well as a localization device 53, comprising a modification device 54 and a positioning device 55. The classification device 52 classifies the objects in the environment surrounding the vehicle, and assigns the corresponding object classes to the object positions, using the object positions as well as optionally, additionally or alternatively, the raw data. The classification results are supplied by the classification device 52 of the localization device 53 and thus by the modification device 54 and the positioning device 55. The positioning device 55 now compares the current object positions from the environment map with a reference map stored in a memory 56 and identifies the position of the vehicle 40 in the reference map. The modification device 54 performs optional modifications in the current environment map and/or the reference map. A merging device 57 can also access the object positions made available by the positioning device 51, and continuously updates the reference map which is stored in a memory 56.

Figure 6:
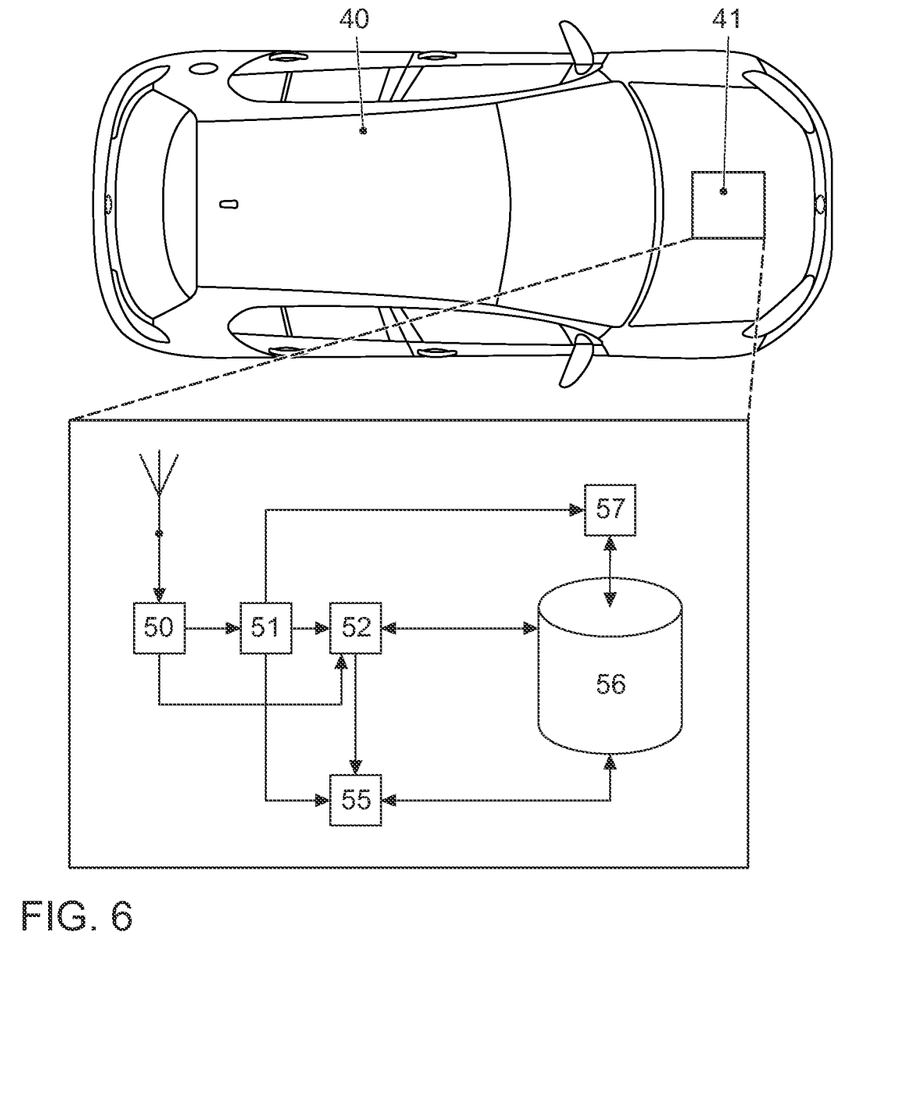
FIG. 6 is a schematic representation of a further, possible embodiment of the device for the improved localization of a vehicle.

According to FIG. 6, another possible embodiment provides a device for the localization of a vehicle 41 which is integrated in a vehicle 40. A radar measurement device 50 emits the radar pulse and performs the angle-resolved and time-resolved measurements of the corresponding radar impulse responses. It then delivers the raw data to a positioning device 51 which identifies the object positions of the objects in the environment surrounding the vehicle and forwards the results to the classification device 52 and to a positioning device 55. The classification device 52 classifies the objects in the environment surrounding the vehicle, using the object positions as well as, optionally, further raw data. The classification results are supplied by the classification device 52 of the positioning device 55. A merging device 57 can also access the object positions made available by the positioning device 51 and will continuously update, for example, at every measurement, the reference map which is stored in a memory 56. The positioning device 55 now compares the current object positions in the environment map with the object positions in the reference map stored in the memory 56 and identifies the position of the vehicle 40 from the reference map. The classification results are hereby directly or indirectly, for example due to the removal of mobile or mobile/stationary objects from the environment map and/or the reference map, taken into account. For this purpose, the classification device 52 performs optional modifications in the current environment map and/or reference map so that such classification results gain a lasting influence on the identification of the vehicle position.

Figure 7:
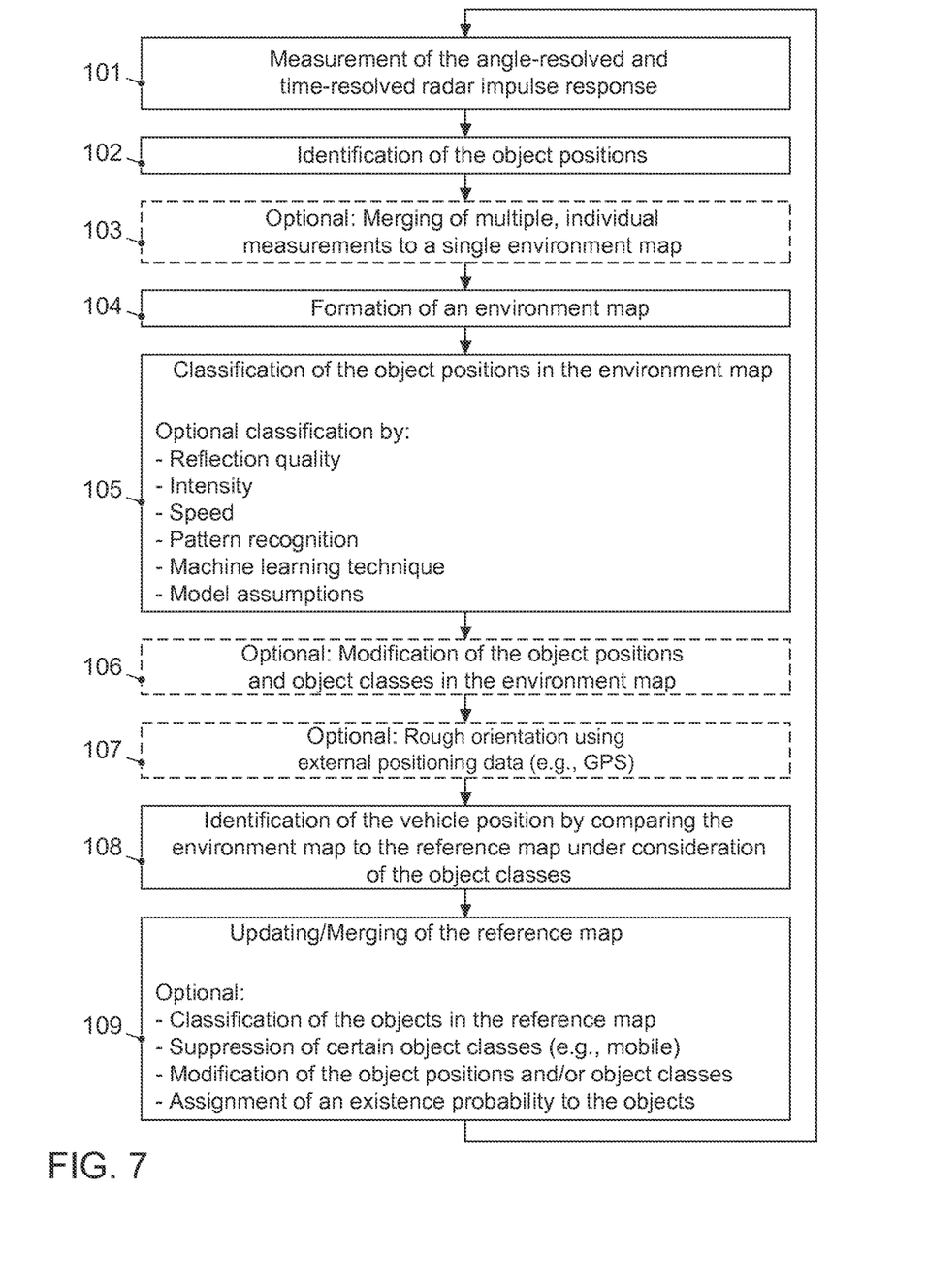
FIG. 7 is a flow chart diagram of an exemplary embodiment for the improved localization of a vehicle.

In FIG. 7, a schematic flow chart is shown, on which basis a possible embodiment of the invention is once more explained. First, a measurement of the angle-resolved and time-resolved radar impulse response 101 is performed, whereby those skilled in the art understand that this measurement can include the emission of a radar impulse and the subsequent measurement of the radar impulse response. From the measured radar impulse response, in the next step, the object positions in the vehicle surrounding environment are identified 102. Optionally, several individual measurements can be merged 103 subsequently. This way, either from the individual measurement or from the merged measurement, a current environment map of the vehicle is formed 104. Hereafter, classification of the object positions in the environment map takes place 105 in which the object positions are assigned an object class. Optionally, one or more criteria can be considered here. Equally optional are a subsequent modification of the object positions and/or object classes in the environment map 106, as well as a rough orientation using external positioning data 107, for example GPS positioning data. Taking the classification results into account, the position of the vehicle relative to the object positions of the surrounding area is identified by comparing the environment map to the reference map 108. A continuous updating or merging of the currently identified object positions and object classes occurs in the environment map with the object positions and object classes already present in the reference map 109. Optionally, a further classification of the object positions stored in the reference map can take place. Also optional is the suppression of certain object classes, for example mobile and mobile/stationary objects, as well as a modification of the object positions and/or object classes in the reference map.

The assignment of an existence probability is also optional.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for locating a vehicle in a fixed reference map in which objects are assigned to one or more positions in the reference map, the method comprising:
    emitting a radar impulse at successive points of a vehicle trajectory of the vehicle, the radar impulse being emitted from a radar sensor located on the vehicle;
    performing angle-resolved and time-resolved measurements of a radar impulse response received by the radar sensor;
    identifying, by a processor, object positions in an environment substantially surrounding the vehicle from the angle-resolved and time-resolved measurements of the radar impulse response, wherein currently identified object positions are used to form an environment map;
    identifying a vehicle position of the vehicle in the reference map by comparing the environment map to the reference map, the reference map being formed by the identified object positions and being continuously updated by merging of the identified object positions;
    performing an object classification for the specific object positions in the current environment map and/or reference map; and
    performing the identification of the vehicle position by taking the object classification into account.

2. The method according to claim 1, wherein reflection intensity of the radar impulse response is used as a classification criterion and is assigned to a specific object position in the current environment map and/or reference map.

3. The method according to claim 1, wherein the object positions identified from a single radar impulse response are used to identify the position of the vehicle in the reference map.

4. The method according to claim 1, wherein several angle-resolved individual measurements are merged into a single, current environment map and the current environment map is used to identify the position of the vehicle from the reference map.

5. The method according to claim 1, wherein a pattern recognition at object positions in the current environment map and/or reference map is performed, wherein an object class is identified using the pattern obtained, and wherein the object class is assigned to the object position in the current environment map and/or reference map.

6. The method according to claim 1, wherein a modification of the positions in the reference map and/or environment map pertaining to an object occurs based on object class, and wherein the object position and/or the classification information is modifiable.

7. The method according to claim 1, wherein the position of a mobile object is identified via its speed and direction of movement relative to a speed and movement direction of the vehicle using a frequency-based analysis of the radar impulse response and the mobile object is removed from the reference map when identifying the vehicle position and when updating the reference map.

8. The method according to claim 1, wherein after an object is classified as a mobile/stationary object, the mobile/stationary object is removed from the reference map when identifying the vehicle position, wherein the mobile/stationary object is an object that is not permanently stationary.

9. The method according to claim 1, wherein for a rough orientation of the vehicle position and/or the positions in the reference map, geographic coordinates of satellite-based, global positioning systems and/or other tracking systems are assigned.

10. A device for locating a vehicle in a reference map, the device comprising:
    a radar measurement device that, at successive points of a vehicle trajectory of the vehicle, emits a radar impulse and subsequently performs an angle-resolved and time-resolved measurement of the radar impulse response;
    a positioning device that identifies object positions in an area surrounding the vehicle from the radar impulse responses, wherein the object positions are used to form an environment map;
    a memory in which the reference map is stored;
    a localization device comprising a positioning device that identifies a vehicle position of the vehicle in the reference map by a comparison to the environment map;
    a merging device that creates the reference map from the identified object positions and continuously updates the reference map by merging of the identified object positions; and
    a classification device that classifies the object positions in the current environment map and/or reference map, wherein the object classes specified for the positions are taken into account when identifying the vehicle position.

11. The method according to claim 8, wherein the mobile/stationary object is a pedestrian or other vehicle.

12. The method according to claim 1, wherein the environment map depicts the currently identified object positions.

* * * * *